(12) United States Patent
Huang et al.

(10) Patent No.: US 8,667,261 B2
(45) Date of Patent: Mar. 4, 2014

(54) SYSTEMS, METHODS, AND APPARATUS FOR UTILITY METER CONFIGURATION

(75) Inventors: Yue Huang, Atlanta, GA (US); David Sampson, Marietta, GA (US); Hyoung Jhang, Johnscreek, GA (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 13/192,001

(22) Filed: Jul. 27, 2011

(65) Prior Publication Data

US 2013/0031339 A1    Jan. 31, 2013

(51) Int. Cl.
*G06F 9/00* (2006.01)
*G06F 9/24* (2006.01)

(52) U.S. Cl.
USPC .................. 713/1; 713/100; 702/61; 702/62; 705/63

(58) Field of Classification Search
USPC ............ 713/1, 100; 702/61, 62; 705/63
See application file for complete search history.

(56) References Cited

U.S. PATENT DOCUMENTS

| | | | |
|---|---|---|---|
| 6,832,372 B1* | 12/2004 | Frye et al. | 717/168 |
| 7,639,129 B2* | 12/2009 | Bickel et al. | 340/506 |
| 7,747,534 B2* | 6/2010 | Villicana et al. | 705/63 |
| 8,214,880 B1* | 7/2012 | Wu | 726/3 |
| 2009/0036105 A1* | 2/2009 | Carion et al. | 455/414.1 |
| 2012/0005465 A1* | 1/2012 | Attanasio et al. | 713/1 |
| 2012/0078548 A1* | 3/2012 | Salazar et al. | 702/62 |
| 2012/0179957 A1* | 7/2012 | Jhang et al. | 715/227 |

* cited by examiner

*Primary Examiner* — Jaweed A Abbaszadeh
(74) *Attorney, Agent, or Firm* — Sutherland Asbill & Brennan LLP

(57) ABSTRACT

Systems, methods, and apparatus for configuring utility meters are provided. A meter configuration application may be executed by a device that includes one or more computers and that facilitates utility meter configuration. A plug-in module associated with a utility meter type may be received by the device. Based at least in part upon providing the plug-in module to the meter configuration application, a configuration file may be built for the utility meter type. The utility meter may then be configured utilizing the configuration file.

17 Claims, 4 Drawing Sheets

SYSTEMS, METHODS, AND APPARATUS FOR UTILITY METER CONFIGURATION

FIELD OF THE INVENTION

Embodiments of the invention relate generally to utility meters, and more specifically to systems, methods, and apparatus for utility meter configuration.

BACKGROUND OF THE INVENTION

Utility meters, such as power meters, are utilized in a wide variety of different applications to monitor and/or communicate utility usage information. Prior to the implementation and use of a utility meter, the utility meter is typically configured with suitable software and configuration information. Conventionally, separate meter configuration software is independently developed for each type of utility meter that is developed and released. The logic included in a version of the configuration software is often tightly coupled with a particular type of utility meter. As such, the configuration software typically includes user interfaces, business logic, and configuration files that are specifically developed for use with a particular meter type. However, independent development of configuration software and meter logic is often time consuming and costly, thereby leading to additional expenditures in meter development and delays in the release of new meter types. Accordingly, an opportunity exists for improved systems, methods, and apparatus for configuring utility meters. Additionally, an opportunity exists for a plug-in architecture for developing and generating meter configuration files.

BRIEF DESCRIPTION OF THE INVENTION

Some or all of the above needs and/or problems may be addressed by certain embodiments of the invention. Embodiments of the invention may include systems, methods, and apparatus for configuring utility meters. According to one embodiment of the invention, there is disclosed a method for configuring a utility meter. A meter configuration application may be executed by a device that includes one or more computers and that facilitates utility meter configuration. A plug-in module associated with a utility meter type may be received by the device. Based at least in part upon providing the plug-in module to the meter configuration application, a configuration file may be built for the utility meter type. The utility meter may then be configured utilizing the configuration file.

According to another embodiment of the invention, there is disclosed a system for configuring a utility meter. The system may include at least one memory and at least one processor. The at least one memory may be configured to store computer-executable instructions. The at least one processor may be configured to access the at least one memory and execute the computer-executable instructions to execute a meter configuration application; receive a plug-in module associated with a utility meter type; build, by providing the plug-in module to the meter configuration application, a configuration file for the utility meter type; and configure a utility meter utilizing the configuration file.

According to yet another embodiment of the invention, there is disclosed a method for configuring a utility meter. A device that includes one or more computers may receive a plug-in module associated with a utility meter type. Utilizing the plug-in module, the device may invoke a meter configuration application that includes predefined functionality that may be adapted for use by a plurality of different meter types to build a configuration file for the utility meter type. Utilizing a generated configuration file, the device may configure the utility meter.

Additional systems, methods, apparatus, features, and aspects are realized through the techniques of various embodiments of the invention. Other embodiments and aspects of the invention are described in detail herein and are considered a part of the claimed invention. Other embodiments, features, and aspects can be understood with reference to the description and the drawings.

BRIEF DESCRIPTION OF THE DRAWINGS

Figure 1:
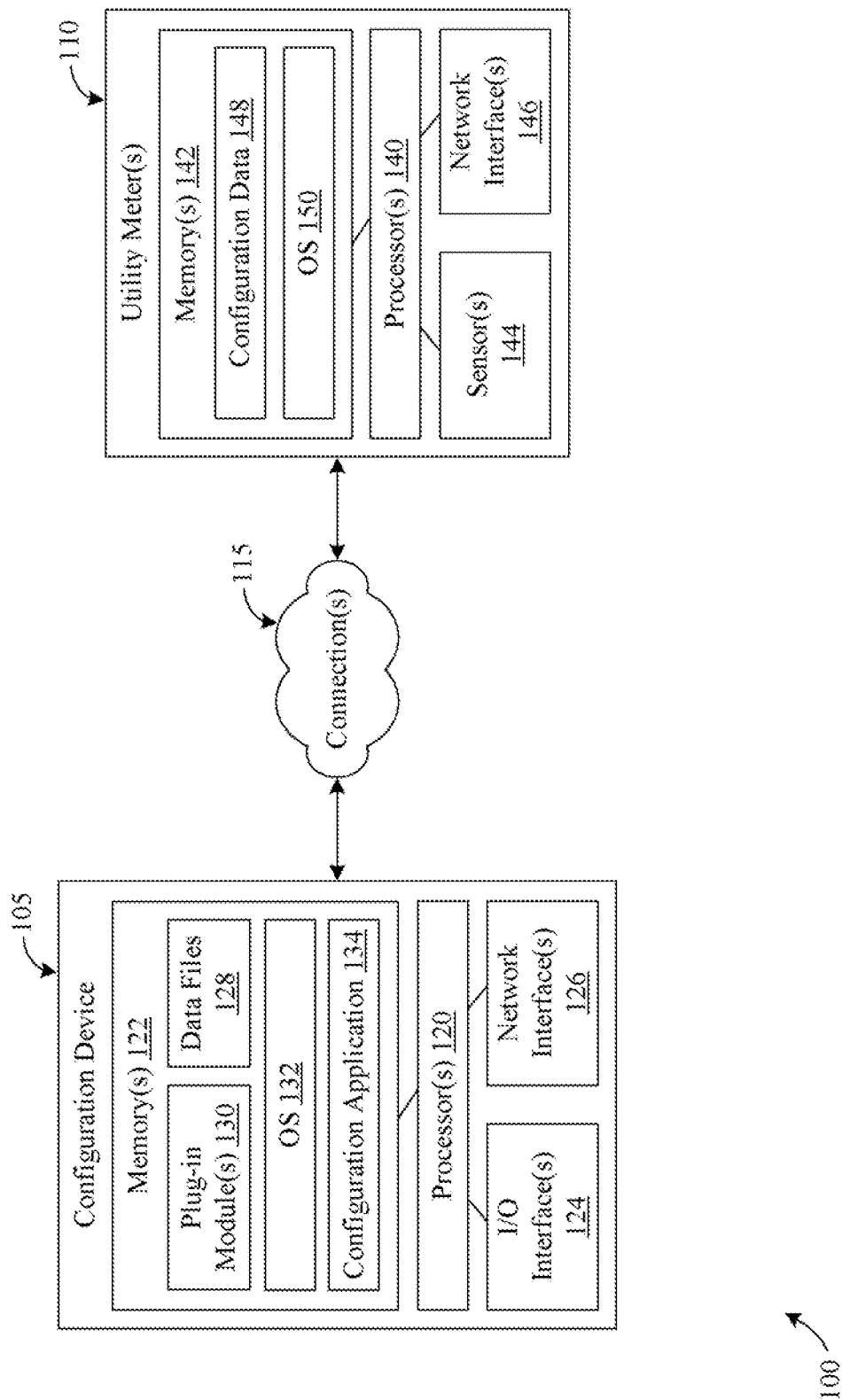

Having thus described the invention in general terms, reference will now be made to the accompanying drawings, which are not necessarily drawn to scale, and wherein:

FIG. 1 is a block diagram of one example system that facilitates utility meter configuration, according to an illustrative embodiment of the invention.

Figure 2:
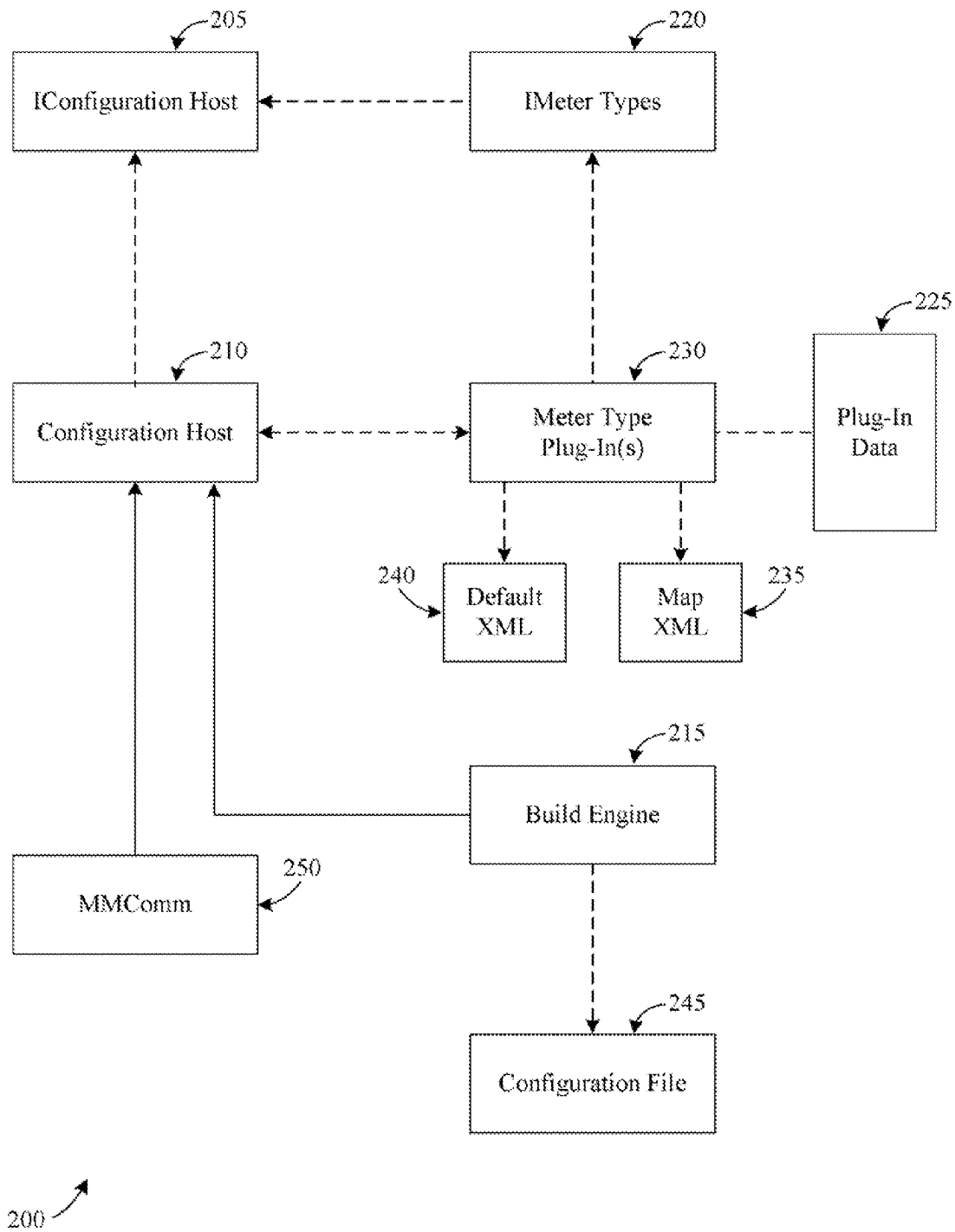

FIG. 2 is a block diagram of an example software architecture of a device that facilitates utility meter configuration, according to an illustrative embodiment of the invention.

Figure 3:
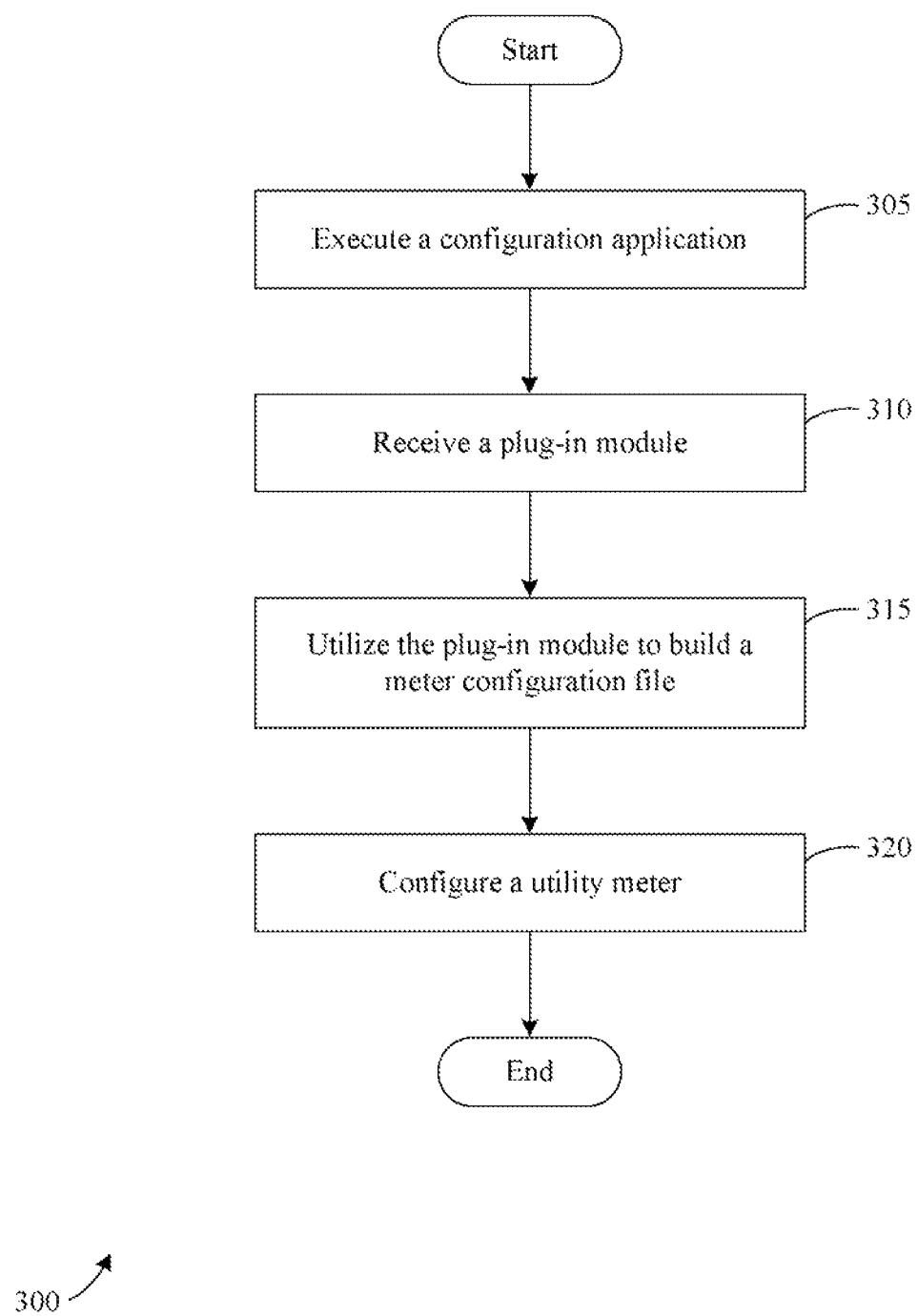

FIG. 3 is a flow diagram of an example method for configuring a utility meter, according to an illustrative embodiment of the invention.

Figure 4:
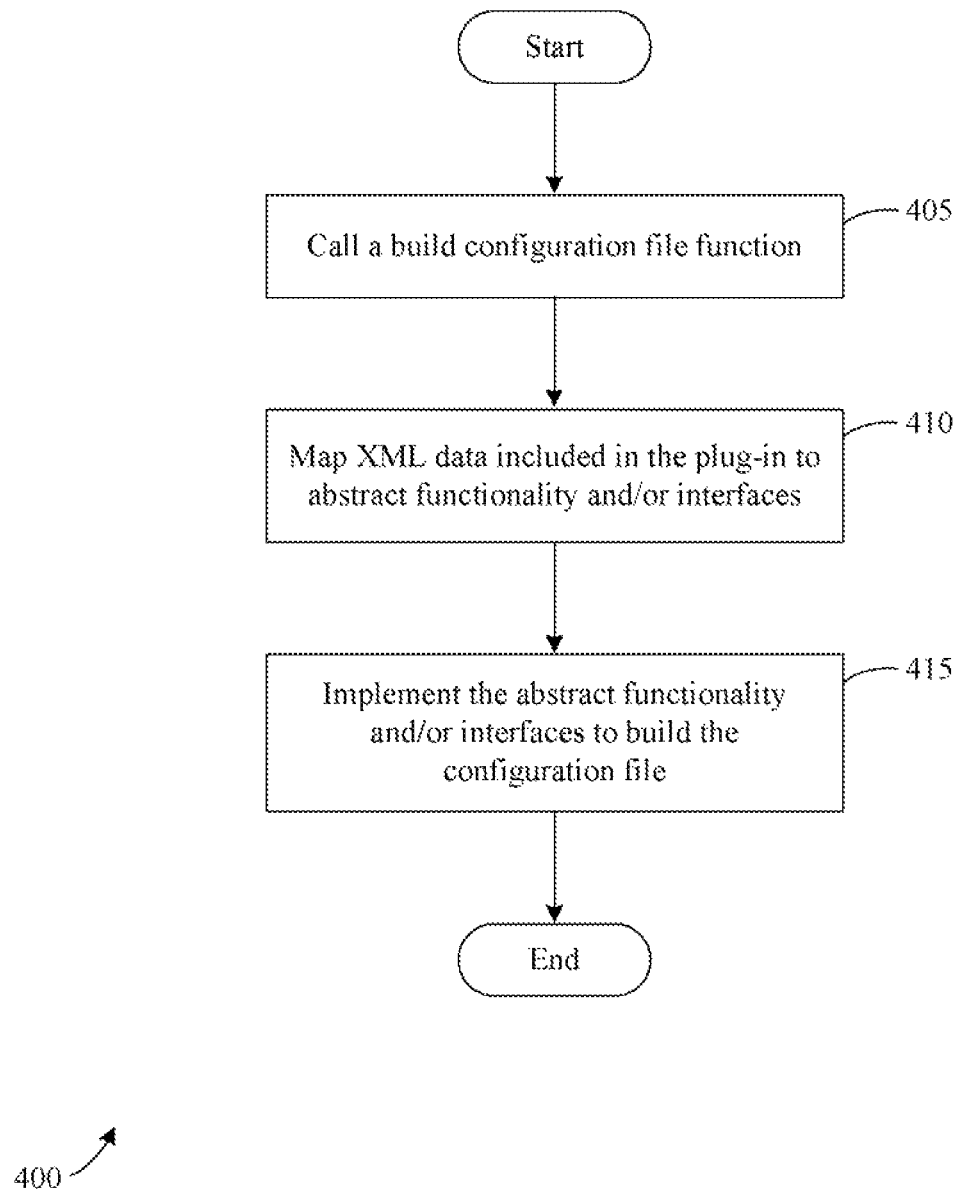

FIG. 4 is a flow diagram of an example method for building a meter configuration file, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein, rather, these embodiments are provided so that this disclosure will satisfy applicable legal requirements. Like numbers refer to like elements throughout.

Disclosed are systems, methods, and apparatus for facilitating utility meter configuration. In certain embodiments of the invention, a plug-in architecture may be provided that facilitates the configuration of a wide variety of different meter types. The plug-in architecture may include predefined functionalities built into a parent framework. For example, the plug-in architecture may include abstract interface classes and/or operational methods or logic that may be adapted to a wide variety of different meter types. When a new utility meter type is developed, a plug-in module for the utility meter may be developed, and the plug-in module may be provided to the plug-in architecture. As a result of implementing the plug-in module in the plug-in architecture, a configuration file may be generated for the new utility meter type. The configuration file may then be utilized to facilitate a configuration of utility meters having the new utility meter type. In this regard, the development time for new meter types may be reduced, and the number of errors encountered during meter deployment may be reduced.

In one example embodiment of the invention, a configuration device may be provided, and a meter configuration application may be executed by the configuration device. The meter configuration application may include a wide variety of different predefined functionality and/or core classes that may be adapted for use by a plurality of different meter types, such as one or more abstract interfaces or abstract interface classes that may be adapted for use by a plurality of different meter types. A plug-in module associated with a utility meter type, such as a newly developed utility meter type, may be received by the device and provided to the meter configuration application. For example, a dynamic-link library assembly including plug-in data for a new meter type may be received and provided to the meter configuration application. The plug-in module may be utilized to invoke certain predefined functionality of the meter configuration application, such as one or more abstract interface classes, and a configuration file may be built for the utility meter type. In certain embodiments, an accessed interface class may be a bidirectional interface that includes both methods or functionality that utilize or invoke plug-in data, and methods or functionality that are utilized or invoked by suitable modules and/or methods included in the plug-in data.

Once a configuration file has been built or prepared, the configuration file may be utilized to configure a utility meter of the utility meter type. In certain embodiments, the configuration file may be driven to a utility meter to facilitate a configuration of the utility meter. In other embodiments, communication may be established between the device and a utility meter, and data associated with the utility meter may be received by the device. At least a portion of the received data may be utilized to modify the configuration file and/or adapt the configuration file for use with the utility meter. The modified configuration file may then be provided to the utility meter to facilitate configuration of the utility meter.

Various embodiments of the invention may include one or more special purpose computers, systems, and/or particular machines that facilitate utility meter configuration. A special purpose computer or particular machine may include a wide variety of different software modules as desired in various embodiments. As explained in greater detail below, in certain embodiments, these various software components may be utilized to build configuration files for a wide variety of different utility meter types and/or to configure individual utility meters.

Certain embodiments of the invention described herein may have the technical effect of facilitating the configuration of utility meters. Additionally, certain embodiments may have the technical effect of utilizing a plug-in architecture and any number of plug-in modules to build or generate respective configuration files for a plurality of different utility meter types. In this regard, the development time for new utility meter types may be reduced. Additionally, errors encountered during utility meter deployment may be reduced.

FIG. 1 is a block diagram of one example system 100 that facilitates utility meter configuration, according to an illustrative embodiment of the invention. The system 100 illustrated in FIG. 1 may include a configuration device 105 and any number of utility meters 110. As desired, one or more suitable connections 115 may be provided between the configuration device 105 and the utility meters 110. In this regard, the configuration device 105 may communicate with a utility meter 110 to facilitate configuration of the utility meter 110.

With reference to FIG. 1, the configuration device 105 may be any suitable device and/or system configured to build meter configuration files and/or to configure utility meters 110. The configuration device 105 may include any number of suitable computer processing components that facilitate the general operation of the configuration device 105, the execution of a configuration application, the receipt of a plug-in module, the building of a configuration file, and/or the configuration of a utility meter 110. Examples of suitable processing devices that may be incorporated into the configuration device 105 include, but are not limited to, application-specific circuits, microcontrollers, minicomputers, personal computers, server computers, other computing devices, and the like. As such, the configuration device 105 may include any number of processors 120 that facilitate the execution of computer-readable instructions to control the operations of the configuration device 105. By executing computer-readable instructions, the configuration device 105 may include or form a special purpose computer that facilitates the building of utility meter configuration files and/or the configuration of utility meters.

In addition to one or more processor(s) 120, the configuration device 105 may include one or more memory devices 122, one or more input/output ("I/O") interface devices 124, and/or one or more network interface devices 126. The one or more memory devices 122 or memories may be any suitable memory devices, for example, caches, read-only memory devices, random access memory devices, magnetic storage devices, etc. The one or more memory devices 122 may store data, executable instructions, and/or various program modules utilized by the configuration device 105, for example, data files 128, plug-in modules 130 or plug-in information, an operating system ("OS") 132, and/or a configuration application 134. The data files 128 may include, for example, information associated with the operation of the configuration device 105, predefined functionalities and/or core classes that may be adapted for configuration of a wide variety of different meter types, information associated with the building of configuration files, information associated with various utility meter types, and/or information associated with various utility meters 110.

Each of the plug-in modules 130 may include information associated with a respective utility meter type. In operation, a plug-in module 130 may be invoked and/or processed by the configuration application 134 to facilitate the building or generation of a configuration file for the associated utility meter type. A wide variety of suitable information may be included in a plug-in module 130, including but not limited to, one or more methods and/or software modules to be executed during the building of a configuration file, utility meter type data (e.g., Extensible Markup Language ("XML") files, etc.) to be mapped to a configuration file, mapping rules for the meter type data, and/or one or more command lists for a utility meter type. In certain embodiments, a plug-in module 130 may include a dynamic-link library ("DLL") assembly that contains utility meter type information; however, other file formats may be utilized as desired.

In certain embodiments of the invention, the configuration device 105 may include any number of software applications or modules that are executed to facilitate the operations of the configuration device 105. The software applications may include computer-readable instructions that are executable by the one or more processors 120. The execution of the computer-readable instructions may form a special purpose computer that facilitates the operations of the configuration device 105, the building of configuration files, and/or the configuration of utility meters. As an example of a software application, the configuration device 105 may include an OS 132 that controls the general operation of the configuration device 105 and that facilitates the execution of additional software applications.

The configuration application 134 or configuration module may be a suitable software module configured to generate and/or build configuration files for a wide variety of different utility meter types. Additionally, the configuration application 134 may be configured to facilitate communication with any number of utility meters 110 in order to configure the utility meters 110. According to an aspect of the invention, the configuration application 134 may include and/or be in communication with a wide variety of predefined functionality that may be utilized by a plurality of different meter types. For example, the configuration application 134 may include a parent framework of core classes and/or other functionality that will support plug-in modules and/or the building or generation of configuration files for different meter types. Additionally, the configuration application 134 may include any number of abstract modules, such as abstract interface classes, that may be implemented in conjunction with plug-in modules to build or generate configuration files. In certain embodiments, an abstract module or an abstract class may include only methods and/or functionality that define certain desired functionality. For example, an abstract interface class may include only methods and/or functionality that define the interface. In this regard, a meter type may be decoupled from an overall plug-in. Additionally, a relatively loose coupling may be created between a configured meter and the main software program executed by the meter.

In operation, the configuration application 134 may receive a plug-in module associated with a utility meter type. For example, the configuration application 134 may receive one or more DLL files associated with a utility meter type. In certain embodiments, the plug-in module may be imported or otherwise provided to a predefined directory that is accessible by the configuration application 134. The configuration application 134 may access the plug-in module and utilize the plug-in module to build a configuration file for a meter type. For example, a build engine associated with the configuration application 134 may utilize a build configuration file function to map XML data (or other meter data) included in the plug-in module to a wide variety of abstract functionality and/or interfaces associated with the configuration application 134. The abstract functionality and/or interfaces may then be implemented by the configuration application 134 to build the configuration file. In doing so, the configuration application 134 may implement or call various modules and/or functions included in the plug-in module. Additionally, as desired, the plug-in module may implement or call various modules and/or functions included in the abstract functionality and/or interfaces. In other words, a bidirectional interface may be provided between the abstract functionality of the configuration application 134 and the plug-in module.

In certain embodiments, once a configuration file has been built, the configuration application 134 may utilize the configuration file to configure a utility meter 110. For example, a utility meter 110 having the meter type associated with the configuration file may be configured. During the configuration of a utility meter 110, a suitable communications session may be established between the configuration device 105 and the utility meter 110. For example, a communications session may be established via one or more suitable connections 115, such as one or more direct communication links and/or network interface connections. The configuration application 134 may then configure the utility meter 110 utilizing the configuration file. In certain embodiments, the utility meter 110 may be configured by the configuration application 134 driving the configuration file to the utility meter 110. In other embodiments, the configuration application 134 may read and/or receive various data from the utility meter 110, such as meter identification information and/or default meter data, and the configuration application 134 may modify the configuration file utilizing at least a portion of the received data. The modified configuration file may then be provided or driven to the utility meter 110.

As desired, a configuration file may be utilized by the meter to establish and/or overwrite a wide variety of meter information, such as information included in one or more configuration tables for the meter. Additionally, the configuration file may be utilized to establish and/or initialize a wide variety of meter applications and/or functionality. For example, the configuration file may adapt or modify an abstract or generic meter software program (e.g., a software program previously loaded or separately loaded on the utility meter 110) for use with a particular meter type. As another example, the configuration file may include a meter software program that has been adapted for use with a particular meter type.

Once configured, the utility meter 110 and/or the meter software program may perform a wide variety of suitable functions. For example, the utility meter 110 may be configured to measure an amount of utility usage (e.g., electrical usage, etc.) supplied to an associated residence, business, or machine. As another example, the utility meter 110 may be configured to facilitate real-time or near real-time readings, power outage notifications, and/or power quality monitoring. Additionally, a wide variety of data may be collected by the utility meter 110 and provided to any number of suitable head end devices.

One example of the operations that may be performed by the configuration application 134 is described in greater detail below with reference to FIG. 3. Additionally, the configuration application 134 may include any number of modules and/or submodules that are implemented to facilitate the operations of the configuration application 134. One example of a software architecture that may be utilized for the configuration application 134 is described in greater detail below with reference to FIG. 2.

The one or more I/O interfaces 124 may facilitate communication between the configuration application 134 and one or more input/output devices, for example, one or more user interface devices, such as a display, keypad, mouse, pointing device, control panel, touch screen display, remote control, microphone, speaker, etc., that facilitate user interaction with the configuration application 134. In this regard, user commands may be received by the configuration application 134. The one or more network interface devices 126 and/or communication interfaces may facilitate connection of the configuration application 134 to any number of suitable networks and/or connections. Examples of suitable network and/or communication interfaces include, but are not limited to, direct connections, cellular interfaces, WiMAX interfaces, power line communication ("PLC") and/or broadband over power line ("BPL") interfaces, cable modem interfaces, digital subscriber line ("DSL") interfaces, and/or any other suitable interfaces. As desired, any number of suitable ports, communications cards, transceivers, transducers, adaptors, radios, and/or other devices may be utilized to interface the configuration application 134 to any number of suitable connections and/or transmission networks, such as the connections 115 that facilitate communication with the utility meters 110.

With continued reference to FIG. 1, the utility meter 110 may be any suitable utility meter that may be configured to execute suitable meter software, such as a suitable electrical meter, water meter, or gas meter. As such, the utility meter 110 may be configured to measure an amount of utility usage (e.g., electrical usage, etc.) supplied to an associated residence, business, or machine. In certain embodiments, the utility meter 110 may be a smart meter or an advanced meter configured to identify consumption in relatively greater detail than a conventional meter. For example, a smart power meter may facilitate real-time or near real-time readings, power outage notifications, and/or power quality monitoring.

The utility meter 110 may include any number of suitable computer processing components that facilitate the general operation of the meter 110 and/or the execution of suitable meter software and/or meter applications. Examples of suitable processing devices that may be incorporated into a utility meter 110 include, but are not limited to, application-specific circuits, microcontrollers, minicomputers, other computing devices, and the like. As such, the utility meter 110 may include any number of processors 140 that facilitate the execution of computer-readable instructions to control the operations of the utility meter 110. By executing computer-readable instructions, the utility meter 110 may include or form a special purpose computer that facilitates the monitoring or measurement of utility usage and/or a wide variety of suitable functionality based upon the monitoring.

In addition to one or more processor(s) 140, the utility meter 110 may include one or more memory devices 142, one or more sensors 144, and/or one or more network interface devices 146. The one or more memory devices 142 or memories may be any suitable memory devices, for example, caches, read-only memory devices, random access memory devices, magnetic storage devices, etc. The one or more memory devices 142 may store data, executable instructions, and/or various program modules utilized by the utility meter 110, for example, configuration data 148, an operating system ("OS") 150, and/or a wide variety of suitable software modules that may be executed by the utility meter 110 and/or the OS 150. The configuration data 148 may include a wide variety of suitable data utilized by the utility meter 110, including but not limited to, default information loaded onto the utility meter 110, one or more configuration tables, a configuration file, and/or various software modules executed by the utility meter 110 (e.g., meter configuration and/or control software, etc.). The OS 150 may be a suitable software module that controls the general operation of the utility meter 110 and that facilitates the execution of additional software applications, such as meter configuration and/or control software.

The one or more sensors 144 may include any suitable sensor devices configured to collect measurements data associated with the operation of the utility meter 110. For example, the sensors 144 may include voltage sensors, current sensors, variable ampere reactive sensors, flow sensors, and/or other suitable devices configured to collect readings and/or other measurements. In this regard, usage data may be collected by the utility meter 110 for processing and/or output.

The one or more network interface devices 146 may facilitate connection of the utility meter 110 to any number of suitable networks, connections, and/or transmission means. Examples of suitable network interfaces include, but are not limited to, ports, cellular interfaces, WiMAX interfaces, PLC and/or BPL interfaces, cable modem interfaces, digital subscriber line ("DSL") interfaces, and/or any other suitable interfaces. As desired, any number of suitable communications cards, transceivers, transducers, adaptors, radios, and/or other devices may be utilized to interface the utility meter 110 to any number of suitable connections and/or transmission networks. In certain embodiments, communications devices and/or communications circuits (e.g., cards, transceivers, transducers, etc.) may be included, incorporated, or integrated into the utility meter 110.

The one or more connections 115 may include any number of suitable communication links and/or networks that facilitate communications between the various components of the system 100, such as the configuration device 105 and the utility meters 110. For example, the one or more connections 115 may include any number of direct connections and/or suitable networks, such as a cellular network, a broadband over power line network, a satellite-based network, a telephone network, a cable network, an Advanced Metering Infrastructure ("AMI") network, a proprietary network associated with a utility service provider, and/or any network in which network traffic is shared among a plurality of devices.

As desired, embodiments of the invention may include a system 100 with more or less than the components illustrated in FIG. 1. The system 100 of FIG. 1 is provided by way of example only.

FIG. 2 is a block diagram of an example software architecture 200 of a device that facilitates utility meter configuration, such as the configuration device 105 illustrated in FIG. 1. The software architecture 200 illustrated in FIG. 2 is one example of a software architecture that may be utilized to build configuration files for a wide variety of different meter types. For example, the software architecture 200 is one example of a software architecture or software framework that may be utilized as the configuration application 134 illustrated in FIG. 1.

With reference to FIG. 2, the software architecture 200 may include and/or be in communication with a wide variety of different modules and/or components, such as an IConfiguration Host component or IConfiguration Host 205, a Configuration Host component or Configuration Host 210, a Build Engine component or Build Engine 215, an IMeter Types component or IMeter Types 220, a Plug-in Data component or Plug-in Data 225, a Meter Type Plug-ins component or Meter Type Plug-ins 230, a MapXML component or MapXML file 235, a DefaultXML component or DefaultXML file 240, a Configuration File component or Configuration File 245, and/or a MMComm component or MMComm 250. Each of these components is discussed in greater detail below. Additionally, as desired in various embodiments, any number of suitable components and/or modules may be utilized, and the components illustrated in FIG. 2 are provided by way of example only.

The IConfiguration Host 205 may include a wide variety of interfaces, methods, and/or predefined rules that facilitate the mapping of data to a configuration file. For example, the IConfiguration Host 205 may include one or more interface files that call, implement, and/or otherwise interact with the Meter Type Plug-ins 230. In this regard, plug-in information may be mapped to the Configuration File 245 by the Build Engine 215. The Configuration Host 210 may include a wide variety of different modules, such as one or more core classes of abstract functionality. In operation, the Configuration Host 210 may implement methods and/or interfaces of the IConfiguration Host 205 to initiate the building of the Configuration File 245 for a meter type.

The Build Engine 215 may include functionality that directs the building of a Configuration File 245 for a new meter type. In other words, the Build Engine 215 may be a suitable component that facilitates the generation of a Configuration File 245. In doing so, the Build Engine 215 may interact with one or more other components of the architecture 200, such as the Configuration Host 210. In operation, when a build operation or method within the Configuration Host 210 is called or invoked, the core class may call the Build Engine 215 to execute a suitable build configuration file method.

The IMeter Types 220 may include a wide variety of interfaces that may be associated with different meter types. In certain embodiments, the interfaces of the IMeter Types 220 may be inherited from the IConfiguration Host 205. In operation, a specific meter plug-in may include one or more classes that implement the IMeter Types 220 interfaces during the building of a Configuration File 245 for a meter type.

The Plug-in Data 225 may include a wide variety of data and/or meter-specific functionality that may be utilized to build a Configuration File 245 for a meter type. For example, the Plug-in Data 225 may include, but is not limited to, selections and/or preferences of common editors and/or core classes provided by the Configuration Host 210, functionality for reading default settings from the DefaultXML file 240, functionality for reading mapping rules from the MapXML file 235, functionality for building default data objects defined by IMeter Types interfaces 220, functionality for building mapping rule data objects defined by the IMeter Types interfaces 220, functionality for calling various functions of the Configuration Host 210, and/or data utilized to build a command list specific to a meter type. The Meter Type Plug-ins 230 may include functionality for accessing the Plug-in Data 225 and implementing the Plug-in Data 225 during the building of a Configuration File 245.

The MapXML file 235 may include data and/or information that defines how meter data will be mapped to a Configuration File 245 for a meter type. Similarly, the DefaultXML file 240 may include data and/or information that defines the type of data that will be utilized by a meter type in a Configuration File 245. The Configuration File 245 may be a file or data construct that is built or generated utilizing plug-in data, abstract functionalities defined by the Configuration Host 210 and/or the IConfiguration Host 205, and/or various mapping rules and/or default data. According to an aspect of the invention, the Configuration File 245 may be associated with a particular meter type, and the Configuration File 245 may be utilized to configure one or more meters of the meter type.

The MMComm 250 may be a suitable module or component that facilitates communication with utility meters. For example, the MMComm 250 may include suitable functionality for reading and/or writing data to utility meters. In this regard, the MMComm 250 may facilitate the configuration of a meter having a meter type associated with the Configuration File 245. In certain embodiments, the MMComm 250 may receive information from a utility meter, and at least a portion of the received data may be utilized to modify the Configuration File 245 during the configuration of the meter.

In operation, the architecture 200 of FIG. 2 may facilitate the building and/or generation of a Configuration File 245 for a meter type. The overall architecture 200 supports core classes that represent the functionality of a meter software program. As part of this functionality, the architecture 200 may define abstract interfaces that may be dynamically loaded. New meter types may be introduced into the architecture 200 by subclassing the abstract interface classes and by implementing one or more methods defined in the interfaces. In certain embodiments, one or more interfaces may be bidirectional. In other words, the interfaces may include methods and/or functionality that a core class calls and/or methods and/or functionality that a plug-in calls. Additionally, an abstract interface or abstract class may include only functionality that defines the interface, thereby decoupling a meter type from an overall plug-in.

With reference to the architecture 200 illustrated in FIG. 2, the Configuration Host 210 may implement the IConfiguration Host 205 interface, and a build configuration file method may be called or invoked. When the build configuration file method is called, the Configuration Host 210 may call the Build Engine 215 to execute the build configuration file method. The Configuration Host 210 may include a build editor types menu method that is executed by the Build Engine 215 to initialize editor list objects. For example, a predefined directory including Plug-in Data 225 may be read to obtain editor list objects that define functionality to be utilized for a meter type. In this regard, a plug-in module may re-use existing user interfaces based upon a wide variety of different development documentation. The Configuration Host 210 may additionally include a build meter types menu method that is executed by the Build Engine 215 to build a list of available meter types. For example, a predefined directory including Plug-in Data 225 may be read in order to dynamically build meter type entries available for use.

A specific Meter Type Plug-in 230 may have a class that implements the IMeter Types interface 220, which may be inherited from the IConfiguration Host 205. The Plug-in 230 (and/or other modules) may perform a wide variety of functions that facilitate the building of a configuration file for a specific meter type. For example, common editors provided by the Configuration Host 210 may be selected, default settings may be read from a Default XML file 240, mapping rules may be read from a MapXML file 235, one or more default setting data objects may be built, one or more mapping rule data objects may be built, and a wide variety of configuration host functions may be called in order to facilitate the building of a Configuration File 245 for the meter type. In other words, abstract interfaces and/or functions may be implemented or invoked utilizing plug-in data and/or mapping rules in order to build a Configuration File 245.

Once a Configuration File 245 has been built, the MMComm 250 may facilitate communication with a utility meter in order to configure the meter utilizing the Configuration File 245. For example, the Configuration Host 210 may implement a read configuration method and/or a set configuration data method in order to call the MMComm 250 to facilitate configuration of a meter.

As a result of utilizing the architecture 200 illustrated in FIG. 2, new meter types may be introduced and brought to market in a relatively rapid manner. Additionally, existing configuration software may be utilized to build software for a new meter type without having to build a main meter application from scratch. In this regard, meter support may be dynamically provided to new meter types. Additionally, the relatively loose coupling of the software architecture 200 may permit various plug-in modules to be developed in an independent manner. Further, the end user experience may be enhanced because a configuration application will be permitted to only implement functionality supported by a meter type. In this regard, a relatively simple and user friendly interface may be provided, thereby reducing error in the meter development and deployment process.

The architecture 200 illustrated in FIG. 2 is provided by way of example only, and a wide variety of other architectures may be utilized as desired in various embodiments of the invention. These architectures may include more or less than the components and/or modules described above with reference to FIG. 2.

FIG. 3 is a flow diagram of an example method 300 for configuring a utility meter, according to an illustrative embodiment of the invention. The method may be utilized in association with one or more utility meter configuration systems, such as the system 100 illustrated in FIG. 1. In certain embodiments, the operations of the method 300 may be performed by a suitable configuration device and/or configuration application, such as the configuration device 105 and/or configuration application 134 illustrated in FIG. 1. The method 300 may begin at block 305.

At block 305, a configuration application 134 may be executed by the configuration device 105. The configuration application 134 may be a suitable software module configured to generate and/or build configuration files for a wide variety of different utility meter types. Additionally, the configuration application 134 may be configured to facilitate communication with any number of utility meters 110 in order to configure the utility meters 110. According to an aspect of the invention, the configuration application 134 may include and/or be in communication with a wide variety of predefined functionality that may be utilized by a plurality of different meter types. For example, the configuration application 134 may include a parent framework of core classes and/or other functionality that will support plug-in modules and/or the building or generation of configuration files for different meter types. Additionally, the configuration application 134 may include any number of abstract modules, such as abstract interface classes, that may be implemented in conjunction with plug-in modules to build or generate configuration files.

At block 310, a plug-in module may be received. For example, a plug-in module may be provided to a predefined or predetermined directory that is accessible by the configuration application 134. At block 315, the plug-in module may be accessed and/or utilized by the configuration application 134 in order to build a meter configuration file for a meter type. For example, one or more modules of the configuration application 134 may invoke functionality of the plug-in module and/or vice versa to facilitate the building of a configuration file. Additionally, in certain embodiments, information associated with the meter type may be mapped to abstract functionality associated with the configuration application in order to build the configuration file. One example of the operations that may be performed at block 315 is described in greater detail below with reference to FIG. 4.

At block 320, which may be optional in certain embodiments of the invention, one or more utility meters may be configured utilizing the configuration file. According to an aspect of the invention, the configured meters may be of a type that is the same as the meter type for which the configuration file was built. A wide variety of suitable methods and/or techniques may be utilized as desired to facilitate the configuration of a meter. For example, a configuration file may be driven to a meter. As another example, a communications session may be established between the configuration device 105 and a meter, and meter information may be received via the established communications session. At least a portion of the received information may be utilized to modify the configuration file, and the modified configuration file may be provided to the meter.

The method 300 may end following block 320.

FIG. 4 is a flow diagram of an example method 400 for building a meter configuration file, according to an illustrative embodiment of the invention. The method 400 may be one example of the operations that may be performed at block 315 of the method 300 illustrated in FIG. 3. As such, the operations of the method 400 may be performed by a suitable configuration device and/or configuration application, such as the configuration device 105 and/or configuration application 134 illustrated in FIG. 1. The method 400 may begin at block 405.

At block 405, the configuration application 134 may call or invoke a suitable build configuration file function and/or method. At block 410, XML data included in a received plug-in may then be mapped to various abstract functionality and/or interfaces by the build configuration file function. A configuration file for a meter type may then be built at block 415 by implementing the abstract functionality and/or interfaces utilizing the plug-in data.

The method 400 may end following block 415.

The operations described and shown in the methods 300, 400 of FIGS. 3 and 4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3 and 4 may be performed.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for configuring a utility meter, the method comprising:
    executing, by a device comprising one or more computers, a meter configuration application;
    receiving, by the device, a plug-in module associated with a utility meter type;
    building, by providing the plug-in module to the meter configuration application, a configuration file for the utility meter type, wherein building a configuration file comprises utilizing the plug-in module to invoke one or more abstract interface classes associated with the configuration application; and
    configuring, by the device, the utility meter utilizing the configuration file.

2. The method of claim 1, wherein executing a meter configuration application comprises executing predefined functionality associated with the configuration application that may be adapted for use by a plurality of different meter types.

3. The method of claim 2, wherein the predefined functionality comprises one or more interfaces that may be adapted for use by the utility meter type.

4. The method of claim 1, wherein receiving a plug-in module comprises receiving a dynamic-link library assembly associated with the utility meter type.

5. The method of claim 1, wherein utilizing the plug-in module to invoke one or more abstract interface classes comprises invoking one or more bidirectional interfaces.

6. The method of claim 1, wherein configuring the utility meter comprises:
    receiving, by the device from the utility meter, data associated with the utility meter;
    modifying, by the device utilizing the received data, the configuration file; and
    providing the modified configuration file to the utility meter.

7. A system, comprising:
    at least one memory configured to store computer-executable instructions; and
    at least one processor configured to access the at least one memory and execute the computer-executable instructions to:
        execute a meter configuration application;
        receive a plug-in module associated with a utility meter type;
        build, by providing the plug-in module to the meter configuration application, a configuration file for the utility meter type, wherein the at least one processor is configured to build the configuration file by executing the computer-executable instructions to invoke, utilizing the plug-in module, one or more abstract interface classes associated with the configuration application; and
        configure a utility meter utilizing the configuration file.

8. The system of claim 7, wherein the meter configuration application comprises predefined functionality that may be adapted for use by a plurality of different meter types.

9. The system of claim 8, wherein the predefined functionality comprises one or more interfaces that may be adapted for use with the utility meter type.

10. The system of claim 7, wherein the plug-in module comprises a dynamic-link library assembly associated with the utility meter type.

11. The system of claim 7, wherein the one or more abstract interface classes comprise one or more bidirectional interfaces.

12. The system of claim 7, wherein the at least one processor is configured to configure the utility meter by executing the computer-executable instructions to:
    receive, from the utility meter, data associated with the utility meter;
    modify, utilizing the received data, the configuration file; and
    provide the modified configuration file to the utility meter.

13. A method for configuring a utility meter, the method comprising:
    receiving, by a device comprising one or more computers, a plug-in module associated with a utility meter type;
    invoking, by the device utilizing the plug-in module, a meter configuration application comprising predefined functionality that may be adapted for use by a plurality of different meter types to build a configuration file for the utility meter type, wherein invoking a meter configuration application comprises invoking one or more abstract interface classes associated with the configuration application; and
    configuring, by the device, the utility meter utilizing the configuration file.

14. The method of claim 13, wherein invoking a meter configuration application comprising predefined functionality comprises executing a configuration application comprising one or more interfaces that may be adapted for use with the utility meter type.

15. The method of claim 13, wherein receiving a plug-in module comprises receiving a dynamic-link library assembly associated with the utility meter type.

16. The method of claim 13, wherein invoking one or more abstract interface classes comprises invoking one or more bidirectional interfaces.

17. The method of claim 13, wherein configuring the utility meter comprises:
    receiving, by the device from the utility meter, data associated with the utility meter;
    modifying, by the device utilizing the received data, the configuration file; and
    providing the modified configuration file to the utility meter.

* * * * *